United States Patent
Gonzales et al.

(10) Patent No.: US 9,957,783 B2
(45) Date of Patent: May 1, 2018

(54) TECHNIQUE FOR PRODUCTION ENHANCEMENT WITH DOWNHOLE MONITORING OF ARTIFICIALLY LIFTED WELLS

(71) Applicant: Weatherford Technology Holdings, LLC, Houston, TX (US)

(72) Inventors: Luis E. Gonzales, Houston, TX (US); Rajan Chokshi, Houston, TX (US)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 420 days.

(21) Appl. No.: 14/719,049

(22) Filed: May 21, 2015

(65) Prior Publication Data

US 2015/0337636 A1  Nov. 26, 2015

Related U.S. Application Data

(60) Provisional application No. 62/002,642, filed on May 23, 2014.

(51) Int. Cl.
| | |
|---|---|
| *E21B 43/12* | (2006.01) |
| *E21B 47/06* | (2012.01) |
| *G05B 15/02* | (2006.01) |
| *E21B 44/00* | (2006.01) |
| *E21B 47/00* | (2012.01) |

(52) U.S. Cl.
CPC .......... *E21B 43/121* (2013.01); *E21B 43/127* (2013.01); *E21B 44/005* (2013.01); *E21B 47/0008* (2013.01); *E21B 47/06* (2013.01); *G05B 15/02* (2013.01)

(58) Field of Classification Search
CPC .... E21B 43/121; E21B 43/127; E21B 44/005; E21B 47/0008; E21B 47/06
See application file for complete search history.

(56) References Cited

U.S. PATENT DOCUMENTS

| | | |
|---|---|---|
| 4,490,094 A | 12/1984 | Gibbs |
| 6,167,965 B1 | 1/2001 | Bearden et al. |
| 7,533,730 B1 | 5/2009 | Corsentino |
| 7,669,651 B1 | 3/2010 | Carstensen |
| 2005/0173114 A1 | 8/2005 | Cudmore et al. |
| 2010/0101774 A1 | 4/2010 | Ocondi et al. |
| 2012/0168153 A1 | 7/2012 | Joseph et al. |

OTHER PUBLICATIONS

International Search Report and Written Opinion dated Jul. 30, 2015, issued in PCT/US2015/032098.
Vogel, J.V., "Inflow Performance Relationships for Solution-Gas Drive Wells," Journal of Petroleum Technology, vol. 20, No. 01, Jan. 31, 1968.

*Primary Examiner* — Caroline N Butcher
(74) *Attorney, Agent, or Firm* — Patterson & Sheridan, L.L.P.

(57) ABSTRACT

Techniques and apparatus are provided for downhole monitoring of an artificial lift system, such as a reciprocating rod lift system, in an effort to enhance production from the system. In aspects, a method for controlling a rod pump used to produce fluids from a wellbore is provided. The method generally includes monitoring one or more downhole parameters in the wellbore and adjusting one or more pump parameters used to control the rod pump based, at least in part, on the monitored downhole parameters.

24 Claims, 11 Drawing Sheets

TECHNIQUE FOR PRODUCTION ENHANCEMENT WITH DOWNHOLE MONITORING OF ARTIFICIALLY LIFTED WELLS

CLAIM OF PRIORITY UNDER 35 U.S.C. § 119

This application claims benefit of U.S. Provisional Patent Application Ser. No. 62/002,642, filed May 23, 2014 and entitled "TECHNIQUE FOR PRODUCTION ENHANCEMENT WITH DOWNHOLE MONITORING OF ARTIFICIALLY LIFTED WELLS," which is herein incorporated by reference in its entirety.

BACKGROUND

Field of the Disclosure

Aspects of the present disclosure generally relate to hydrocarbon production using artificial lift and, more particularly, to a technique for production enhancement with downhole monitoring for an artificial lift system, such as a reciprocating rod lift system.

Description of the Related Art

To obtain production fluids (e.g., hydrocarbons), a wellbore is drilled into the earth to intersect a productive formation. Upon reaching the productive formation, pumps can be used in wells to help bring production fluids from the productive formation to a wellhead located at the surface. This is often referred to as providing artificial lift, as the reservoir pressure may be insufficient for the production fluid to reach the surface on its own (i.e., natural lift).

Several artificial lift techniques are currently available to initiate and/or increase hydrocarbon production from drilled wells. These artificial lift techniques include rod pumping, plunger lift, gas lift, hydraulic lift, progressing cavity pumping, and electric submersible pumping, for example.

Matching reservoir inflow to the displacement (or lifting capacity) of an artificial lift system is a classical problem faced by oil and gas asset operators. Often, when a lift system is planned and designed, incomplete or inaccurate information is available, which leads to an overdesigned artificial lift system that does not perform optimally. Even when the available data is fairly complete and representative of the entire production system, over time the reservoir performance, fluid properties and/or system configuration may change, resulting in further mismatch between influx and displacement, leading to performance and efficiency degradation.

Operators use surface well test data, downhole pressure/temperature surveys, fluid level measurements, or combinations of the above to assess reservoir capabilities and attempt to diagnose causes and correct for the lift system malperformance. These approaches cause temporary production interruptions, at times costly downhole tool losses, and exposure of personnel to hazardous conditions. Such measurements are typically conducted for the shortest possible time to minimize interruptions and related losses, resulting in snapshots of potentially dynamic situations/systems. The data snapshots are entered into software tools, analysis is conducted, and desired settings are conveyed to field personnel or to field control systems. Such manual capture-process-analyze-implement cycles take considerable time and may call for well-trained analysts. Effectiveness of a particular implementation may not be analyzed until the next data capture cycle occurs.

Permanent downhole monitoring systems allow continuous, high-frequency measurement of critical system parameters such as pressure, temperature, vibration, and microseismic activities. Operators have traditionally shied away from the usage of permanent downhole monitoring systems, except for high value assets producing higher rates. Typically, the main reason for not using such systems in "low value/volume" wells has been the initial cost. Another and equally important reason has been the unavailability of data processing and analytical tools that provide implementable information instead of gigabytes of streamed and unmanageable data that operators have no time to handle.

Accordingly, what is needed are techniques and apparatus for analyzing monitored downhole data for production enhancement of an artificial lift system.

SUMMARY

The systems, methods, and devices of the disclosure each have several aspects, no single one of which is solely responsible for its desirable attributes. Without limiting the scope of this disclosure, some features will now be discussed briefly. After considering this discussion, and particularly after reading the section entitled "Detailed Description," one will understand how the features of this disclosure provide advantages that include improved production for artificially lifted wells.

Aspects of the present disclosure generally relate to downhole monitoring, estimating efficiency, and controlling artificial lift system operations, and, more particularly, to a technique for production enhancement with downhole monitoring, for an artificial lift system, such as a reciprocating rod lift system.

One aspect of the present disclosure is a method for controlling a rod pump used to produce fluids from a wellbore. The method generally includes monitoring one or more downhole parameters in the wellbore and adjusting one or more pump parameters used to control the rod pump based, at least in part, on the monitored downhole parameters.

Another aspect of the present disclosure is a system for producing fluids from a wellbore. The system generally includes a rod pump disposed in the wellbore, one or more sensors deployed in the wellbore and configured to monitor one or more downhole parameters in the wellbore, and a controller configured to adjust one or more pump parameters used to control the rod pump based, at least in part, on the monitored downhole parameters.

Yet another aspect of the present disclosure is an apparatus for controlling a rod pump used to produce fluids from a wellbore. The apparatus generally includes means for monitoring one or more downhole parameters in the wellbore and means for adjusting one or more pump parameters used to control the rod pump based, at least in part, on the monitored downhole parameters.

Yet another aspect of the present disclosure is a non-transitory computer-readable medium having instructions stored thereon for controlling a rod pump used to produce fluids from a wellbore. The instructions generally include instructions for monitoring one or more downhole parameters in the wellbore and instructions for adjusting one or more pump parameters used to control the rod pump based, at least in part, on the monitored downhole parameters.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only typical aspects of this disclosure and are therefore not to be considered limiting of its scope, for the disclosure may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. The detailed description and drawings are merely illustrative of the disclosure rather than limiting, the scope of the disclosure being defined by the appended claims and equivalents thereof.

Aspects of the present disclosure generally relate to downhole monitoring, estimating efficiency, and controlling the operation of a downhole pump, and, more particularly, to a technique for production enhancement with downhole monitoring, for an artificial lift system, such as a reciprocating rod lift system.

Example Artificial Lift System

A reciprocating rod lift system is one example of an artificial lift system in which the techniques of this disclosure may be applied. However, these techniques are not limited to reciprocating rod lift systems, and may equally be applied to optimize, or at least enhance, any type of artificial lift system, such as plunger lift systems, gas lift systems, hydraulic lift systems, progressing cavity pumping systems, and/or electric submersible pumping systems.

The production of oil with a sucker-rod pump (which may also be referred to as a reciprocating rod lift system or rod pumping lift system) is common practice in the oil and gas industry. An oil well completion generally comprises a casing, a string of smaller steel pipe inside the casing generally known as production tubing, a pump disposed downhole in the wellbore, and a string of steel rods (commonly referred to as sucker rods) within the production tubing and extending down into a pump barrel for operating the pump. Various devices as are well known in the art may be provided at the surface of the well for reciprocating the rod string to operate the pump.

Figure 1:
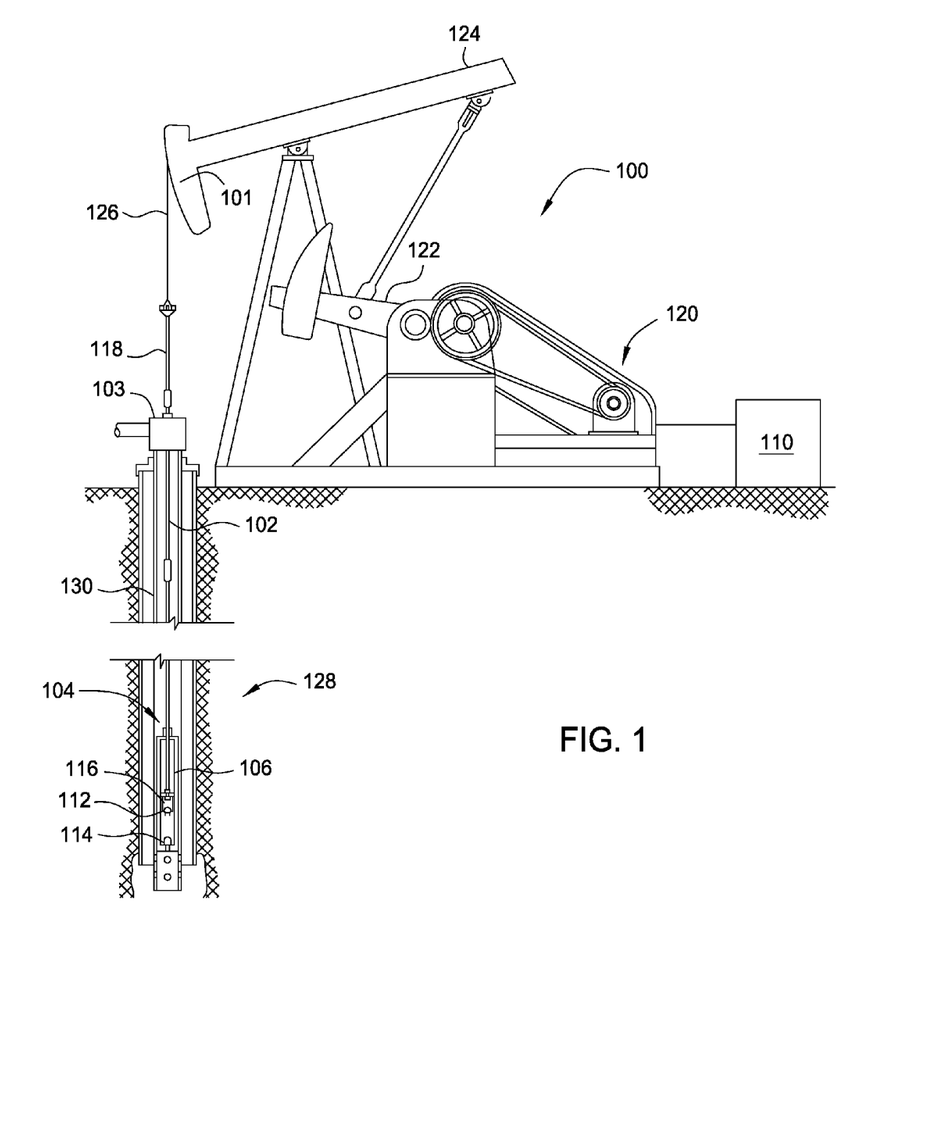
FIG. 1 illustrates an example reciprocating rod lift system with a control unit for controlling a rod pump in an effort to extract fluid from a well, according to certain aspects of the present disclosure.

FIG. 1 illustrates a reciprocating rod lift system 100 with a control unit 110 (e.g., including a rod pump controller or variable speed drive controller) for controlling the rod pump in an effort to extract fluid from a well, according to certain aspects of the present disclosure. Although shown with a conventional pumping unit in FIG. 1, the reciprocating rod lift system 100 may employ any suitable pumping unit.

The reciprocating rod lift system 100 is driven by a motor or engine 120 that turns a crank arm 122. Attached to the crank arm 122 is a walking beam 124 and a horsehead 101. A cable 126 hangs off the horsehead 101 and is attached to a sucker rod 102 (e.g., a string of steel rods or a continuous rod string). The sucker rod 102 is attached to a downhole rod pump 104 located within the wellbore 128. In operation, the motor 120 turns the crank arm 122 which reciprocates the walking beam 124 which reciprocates the sucker rod 102.

In the reciprocating rod lift system 100, the rod pump 104, which may for example be employed in the wellbore 128, consists of a pump barrel 106 with a valve 114 (the "standing valve") located at the bottom that allows fluid to enter from the wellbore, but does not allow the fluid to leave. The pump barrel 106 can be attached to or part of the production tubing 130 within the wellbore 128. Inside the pump barrel 106 is a close-fitting hollow plunger 116 with another valve 112 (the "traveling valve") located at the top. This allows fluid to move from below the plunger 116 to the production tubing 130 above and does not allow fluid to return from the tubing 130 to the pump barrel 106 below the plunger 116. The plunger 116 may be moved up and down cyclically by the horsehead 101 at the surface via the sucker rod 102, where the motion of the pump plunger 116 comprises an "upstroke" and a "downstroke," jointly referred to as a "stroke." The polished rod 118, which is a portion of the rod string passing through a stuffing box 103 at the surface, may enable an efficient hydraulic seal to be made around the reciprocating rod string. A control unit 110, which may be located at the surface, may control the system 100.

Typically, the reciprocating rod lift system 100 is designed with the capacity to remove liquid from the wellbore 128 faster than the reservoir can supply liquid into the wellbore 128. As a result, the downhole pump does not completely fill with fluid on every stroke. The well is said to be "pumped-off" when the pump barrel 106 does not completely fill with fluid on the upstroke of the plunger 116. The term "pump fillage" is used to describe the percentage of the pump stroke which actually contains liquid.

Being a positive displacement pumping system, the rod-pump systems (e.g., such as reciprocating rod lift system 100) can reduce the bottom hole pressure to a "near zero" value. The foremost goal of rod pumping optimization is to match well displacement to inflow, which may be difficult if inflow is unknown or highly uncertain. Uncertainty related to inflow may lead to an overly conservative approach, for example, where the system is designed or operated such that the pump displacement is lower than the inflow, such as by continuous pumping. In this case, the rod lift system runs without any problem and is sometimes referred to as "optimized" operation, although the well production is usually suboptimal and losing revenue. In another example, uncertainty related to inflow may lead to an overly aggressive approach, for example, where the system is designed or operated such that the pump displacement is higher than the inflow, such as by intermittent pumping. In this case, the downhole pump and rod lift system suffers from issues such as fluid pound, pump-off, gas interference, and correspondingly higher failure rates due to incomplete pump fillage.

Pump control devices, such as rod pump controllers (RPC) and variable speed drives (VSD), help prevent or significantly reduce the effects of fluid pound, pump-off, etc. Pump control typically uses an input called "idle time," which is the amount of time for a pump to be shut down so that the reservoir inflow catches up with the pump. Operators resort to frequent fluid level "shooting" operations to understand reservoir inflow.

Although it is widely understood that pressure measurement is an important variable, conventionally, only inferred and periodic pressure values are obtained from fluid level measurement. The present disclosure illustrates the value of using downhole permanent gauges (DHPG) with rod pumps to overcome the above challenges. Downhole pressure and/or temperature measurements may help to accurately and dynamically define inflow in real-time, such that production may be optimized, or at least enhanced compared to conventional production techniques.

Example Technique for Production Enhancement with Downhole Monitoring of Artificially Lifted Wells An approach is provided herein for a well-integrated lift enhancement system, which couples downhole monitoring pressure data to field-proven, yet flexible algorithms yielding real-time analysis that is implemented immediately using a field control device with little or no operator intervention for a particular artificial lift system.

According to certain aspects, an artificial lift system (e.g., the reciprocating rod lift system 100) may be equipped with a downhole gauge for monitoring downhole parameters, such as pressure and/or temperature. In this case, downhole parameters can be measured more accurately, rather than using estimates of these parameters based on surface measurements. For example, downhole pressure and/or temperature may be measured continuously (e.g., every second).

Example Real-Time Downhole Pressure Measurements

Figure 2:
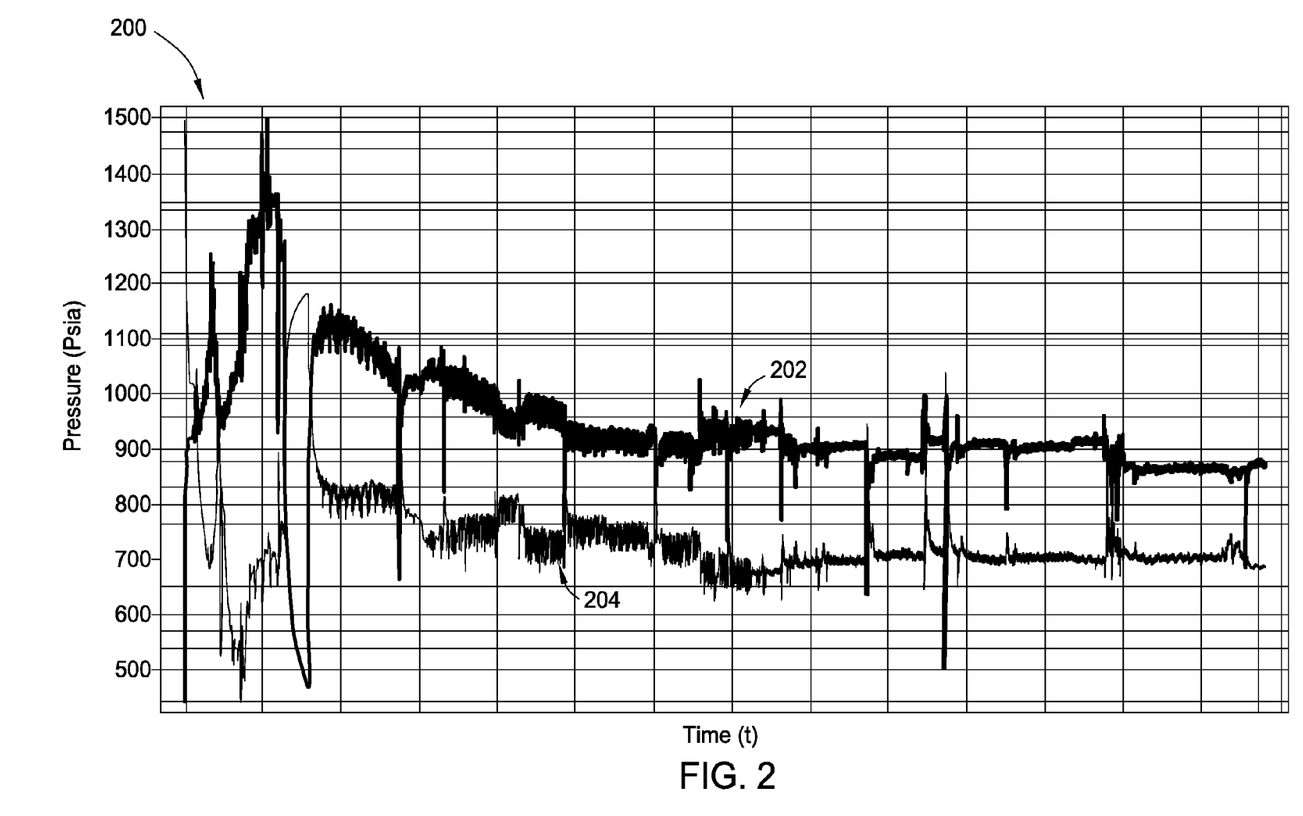
FIG. 2 is a plot illustrating example downhole temperature and pressure over time in a well using a reciprocating rod lift system, according to certain aspects of the present disclosure.

FIG. 2 is a plot 200 illustrating example downhole temperature and pressure over time in a well using a rod pump artificial lift system, according to certain aspects of the present disclosure. The bottom curve 204 represents downhole pressure over time (e.g., several months), and the top curve 202 represents downhole temperature over the same amount of time. These example values in the plot 200 are for a well having a true vertical depth (TVD) of 4048 feet, a pump located at 3806 feet, and a downhole gauge at 3,737 feet. The well produces (16 API) oil with a twenty percent (20%) water cut. The rod pump was designed to produce 200 barrels of liquid per day (BLPD). As shown in FIG. 2, the downhole pressure may not be steady-state over time; instead, the downhole pressure may be dynamic, fluctuating over time.

Figure 3:
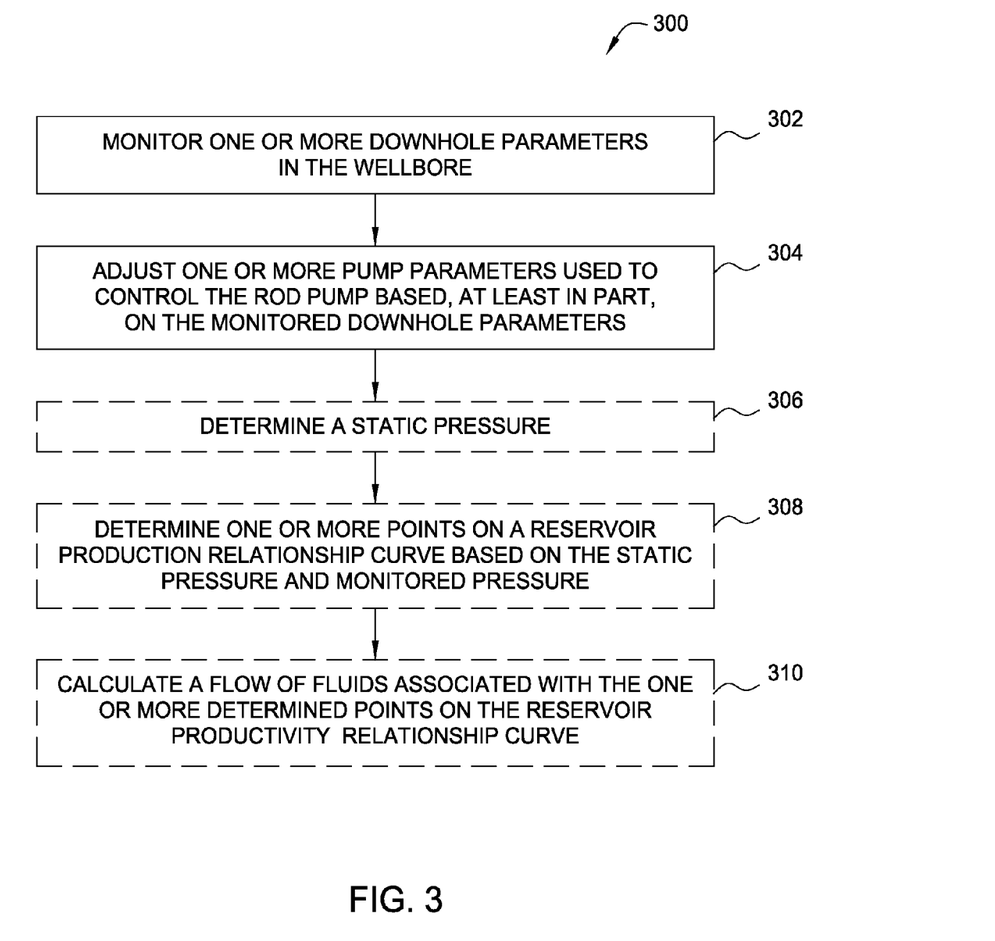
FIG. 3 is a flow diagram illustrating example operations for controlling a rod pump used to produce fluids from a wellbore, according to certain aspects of the present disclosure.

Example Operations for Production Enhancement with Downhole Pressure Measurements FIG. 3 is a flow diagram illustrating example operations 300 for controlling a rod pump used to produce fluids from a wellbore, according to certain aspects of the present disclosure. The operations 300 may be performed, for example, by a processing system (e.g., a controller such as a rod pump controller) and one or more downhole sensors. The operations 300 may begin, at 302, by monitoring one or more downhole parameters (e.g., water cut, temperature, and/or pressure) in the wellbore. In aspects, the one or more downhole parameters may be monitored via one or more permanently installed sensors (e.g., pressure and/or temperature sensors) located downhole.

At 304, one or more pump parameters used to control the rod pump may be adjusted based, at least in part, on the monitored downhole parameters. For example, at 306, static pressure may optionally be determined (e.g., measured when there is no pumping being performed). At 308, one or more points on a reservoir productivity relationship curve (e.g., an inflow performance relationship (IPR) curve) may optionally be determined based on the static pressure and monitored pressure (e.g., pressure measured downhole over time during pumping). At 310, a flow of the fluids associated with the one or more determined points on the reservoir productivity curve may optionally be calculated. According to certain aspects, the one or more pump parameters used to control the rod pump (e.g., stroke speed, stroke length, minimum rod load, or maximum rod load) may be adjusted based, at least in part, on one or more of the determined points on the reservoir productivity curve.

According to certain aspects, the operations 300 may further involve redetermining the static pressure and determining one or more other points on another reservoir productivity relationship curve based on the redetermined static pressure and the monitored pressure. In this case, a flow of the fluids associated with the one or more other determined points on the other reservoir productivity relationship curve may be calculated. For certain aspects, the one or more pump parameters used to control the rod pump may be readjusted based, at least in part, on one or more of the other determined points on the other reservoir productivity relationship curve.

The aspects described above are specific to reciprocating rod lift application; however, in some aspects, the described approach, for example with different algorithms, may be extended to other lift mechanisms. For example, in the case of the rod pump system, the inflow data may be used to enhance production by adjusting the speed of the pumping unit; in the case of a gas lift system, the inflow data may be used to enhance production by adjusting the injection rate; and in the case of electric submersible pumping, the inflow data may be used to enhance production by adjusting the speed of the downhole pumping mechanism.

The production enhancement techniques for artificial lift systems with downhole monitoring of operations 300 are described in greater detail below.

Example Downhole Pressure Analysis

Figure 4:
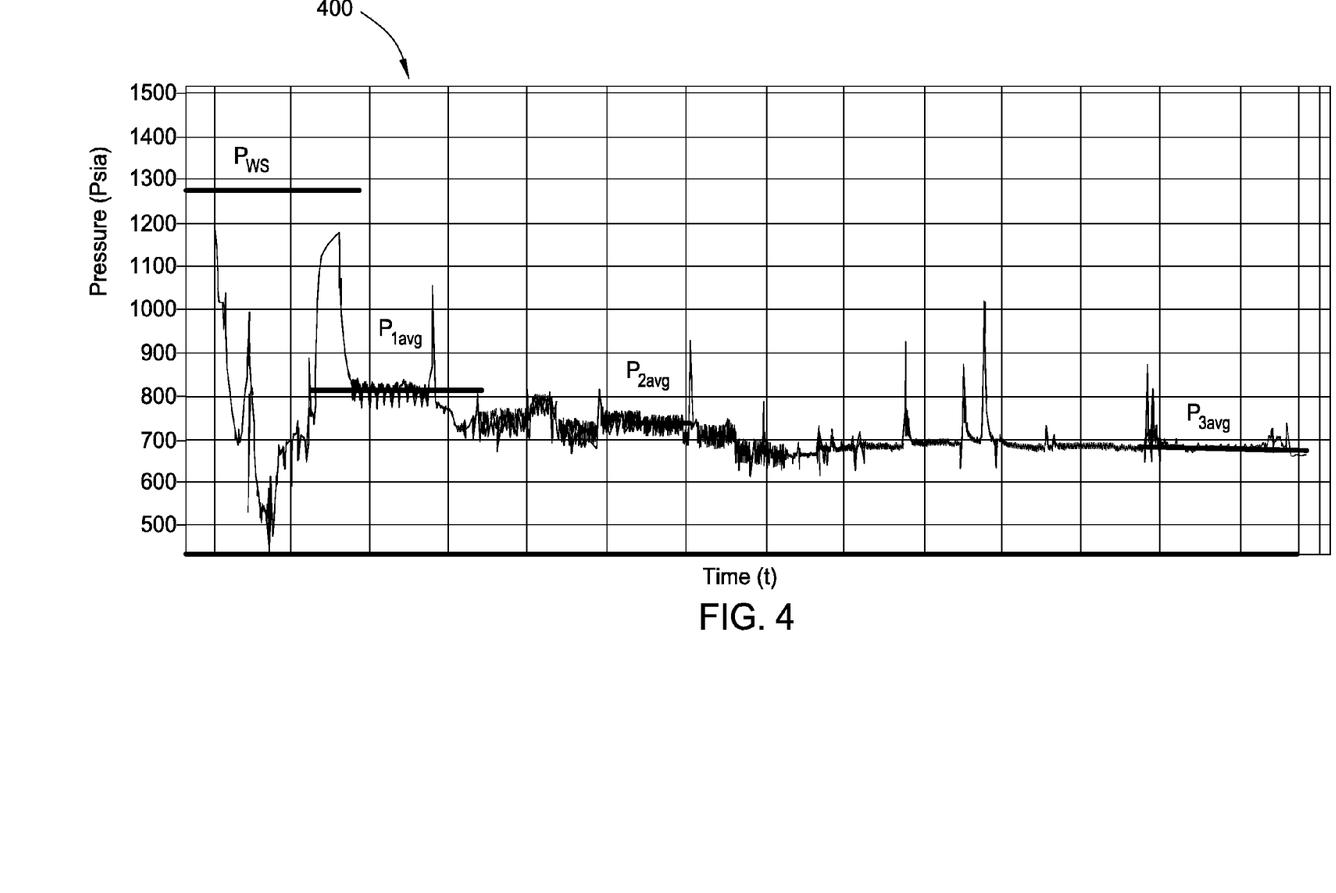
FIG. 4 is a plot illustrating average downhole pressure for different periods in the plot of FIG. 2, according to certain aspects of the present disclosure.

Using the monitored downhole pressure (e.g., depicted by the bottom curve 204 of FIG. 2), it is possible to determine average flowing bottom pressures for different periods of the well operations. FIG. 4 is a plot 400 illustrating average downhole pressure for different periods in the example pressure plot of FIG. 2, according to certain aspects of the present disclosure. As shown in FIG. 4, the static pressure ($P_{ws}$), the pressure measured at static conditions when the well is not flowing, may be a set point. Using the plot 400, average flowing bottom pressures ($P_{avg}$) may be found for different periods. For the example illustrated in FIG. 4, the average pressures may be $P_{1avg}$=819 psi, $P_{2avg}$=744 psi, and $P_{3avg}$=704 psi.

These flowing pressures measured at the gauge location can be corrected to the middle point of the perforations (MPP) using the estimated average density of the oil and water. In this example, the MPP is at 3978 feet depth, so a difference of 241 feet can be used (i.e., the difference between the MPP and the gauge, 3978 feet–3737 feet=241 feet). The pressure exerted by this 241 feet column will vary from 100.18 psi to 104.42 psi, due to the density variations in mixture of oil, water, and some dissolved gas. Therefore, the adjusted average pressures may be calculated as:

$P_{1avg}$=819 psi+100.18 psi=919.18 psi;

$P_{2avg}$=744 psi+100.18 psi=844.18 psi; and $P_{3avg}$=704 psi+100.18 psi=804.18 psi 100.18 psi is used because the water cut is 20%; therefore the pressure will be closer to 100 psi than 104 psi, which is a small difference that can be practically ignored.

For each $P_{avg}$, there is a corresponding flow rate (Q). Using the static pressure $P_{ws}$, a reservoir productivity relationship curve, such as an inflow performance relationship (IPR) curve may be defined.

Example Static Pressure ($P_{ws}$) Estimation

According to certain aspects, the static pressure ($P_{ws}$) can be obtained from the trend pressure. For example, even if $P_{ws}$ is not known, having real-time downhole pressure measurements, as described above, may enable $P_{ws}$ to be estimated. Further, anytime the well stops running (i.e., Q=0), the $P_{ws}$ can be measured. The static pressure can be obtained at the beginning, before any production of the well just after well completion, or at any time after a buildup can be obtained.

Figure 5:
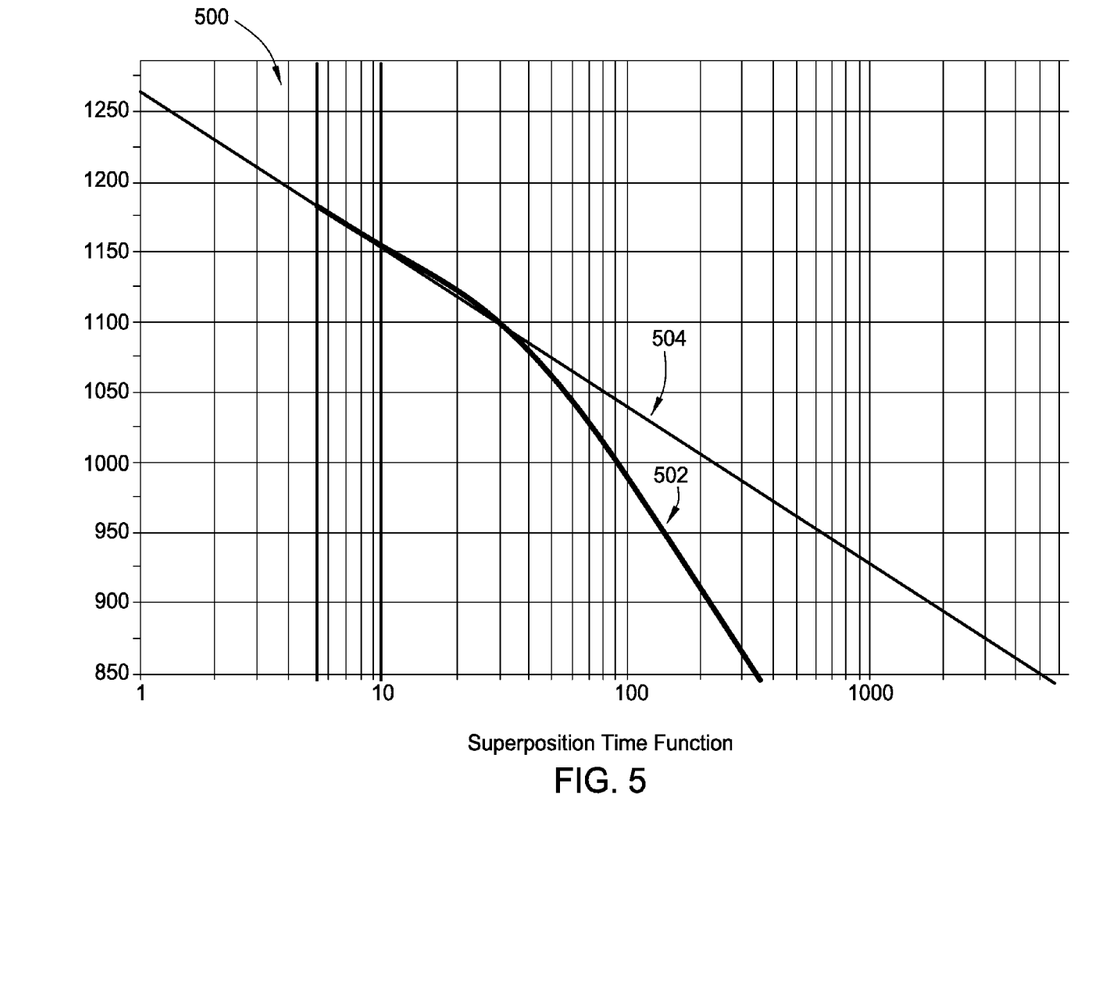
FIG. 5 is a semi-log plot illustrating example downhole pressure Horner analysis to obtain static pressure in the example reciprocating rod lift system, according to certain aspects of the present disclosure.

FIG. 5 is a semi-log plot 500 illustrating example downhole pressure Horner analysis to obtain static pressure, according to certain aspects of the present disclosure. FIG. 5 shows Horner buildup analysis, which may be used to estimate the $P_{ws}$. As shown in FIG. 5, the bottom curve 502 may correspond to the downhole pressure measurements, and the top curve 502 may correspond to the estimated $P_{ws}$.

According to the method by Horner, buildup pressures may be graphed versus log [(t+Δt)/Δt] in order to produce a semilog straight line. The slope of the line is used to determine permeability from the following equation:

$k=q\mu\cdot\ln 10/4 \Pi mh$

Horner suggested that for variable rate production prior to shut-in, the permeability should be calculated using q equal to the last established flow rate and m determined from the slope of a graph of $p_{ws}(\Delta t)$ versus log $[(t_p^*+\Delta t)/\Delta t]$, where $t_p^*=Q(t_p)/q(t_p)$.

Example Calculation of IPR Curve Using Pressure

According to certain aspects, each pressure (e.g., each downhole pressure measurement) may be associated with a corresponding flow rate (Q). For example, using the pressure from the above example discussed with respect to FIG. 4, the static pressure $P_{ws}$ of 1,336.00 psi may correspond to the flow rate $Q_0$, the downhole pressure $P_{1avg}$ of 919.18 psi may correspond to the flow rate $Q_1$, the downhole pressure $P_{2avg}$ of 844.18 psi may correspond to the flow rate $Q_2$, and the downhole pressure $P_{3avg}$ of 804.18 psi may correspond to the flow rate $Q_3$.

According to certain aspects, using the known values for static pressure ($P_{ws}$) and average downhole pressure ($P_{avg}$), an Inflow Performance Relation (IPR) curve may be calculated, without knowing the flow rates, using a Vogel equation or another such inflow performance relationship.

The IPR for a well is the relationship between the flow rate (Q) of the well and the flowing pressure ($P_{avg}$) of the well. In single-phase flow, this relationship is a straight line, but when gas is moving in the reservoir, at a pressure below the bubble point, this is not a linear relationship. Vogel developed the following empirical equation for the shape of the IPR curve:

$$\frac{Q}{Q_{max}} = 0.8\left(\frac{P_{avg}}{P_{ws}}\right) - 0.2\left(\frac{P_{avg}}{P_{ws}}\right)^2$$

Figure 6:
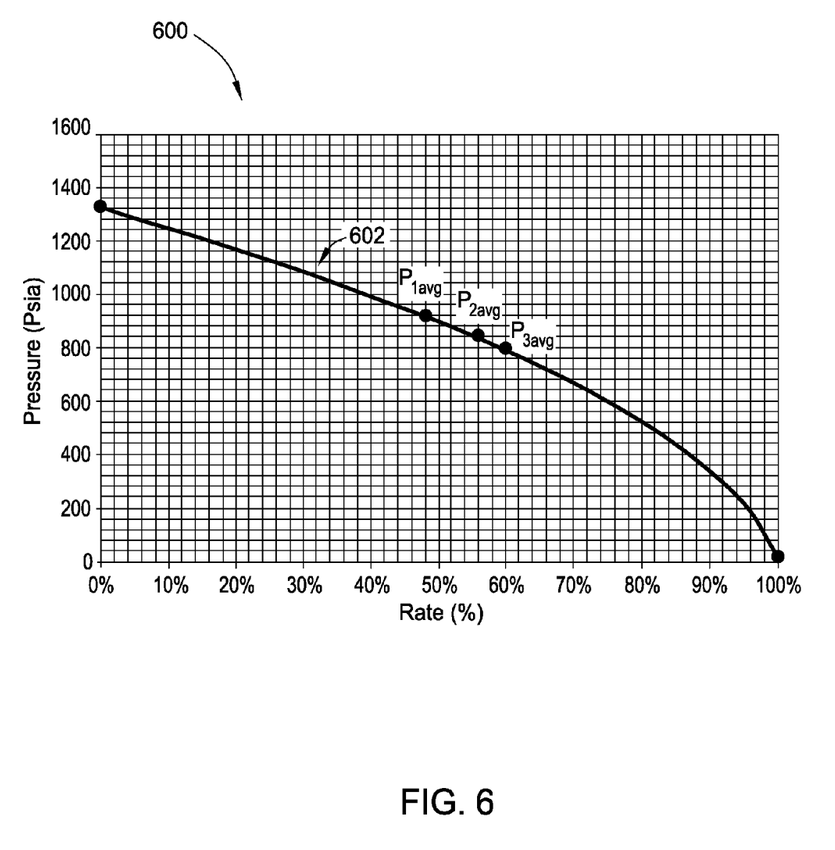
FIG. 6 is a plot illustrating an example normalized inflow performance relationship (IPR) curve for the example reciprocating rod lift system calculated using the Vogel relationship, according to certain aspects of the present disclosure.

FIG. 6 is a plot 600 illustrating an example normalized IPR curve 602 (i.e., relative IPR rather than absolute) calculated using the Vogel relationship without knowing the flow rates, for the example pressure values described above, according to certain aspects of the present disclosure. Using the example pressure values, if the Vogel relationship is applied for each pressure, then the normalized IPR for the $P_{ws}$ of 1,336.00 psi at $Q_0$ is 0 0.00%; the normalized IPR Q-value for the adjusted $P_{1avg}$ of 919.18 psi is 48.00%; the normalized IPR Q-value for the adjusted $P_{2avg}$ of 844.18 psi is 55.65%; the normalized IPR Q-value for the adjusted $P_{3avg}$ of 804.18 psi is 59.47%; and the normalized IPR Q-value for the atmospheric pressure ($P_{atm}$) of 14.7 psi is 100.00%. The 100% on thin normalized IPR Q-value is denoted as $Q_{max}$ in the expression above. It is also referred to as AOF (Absolute Open Flow).

Figure 7:
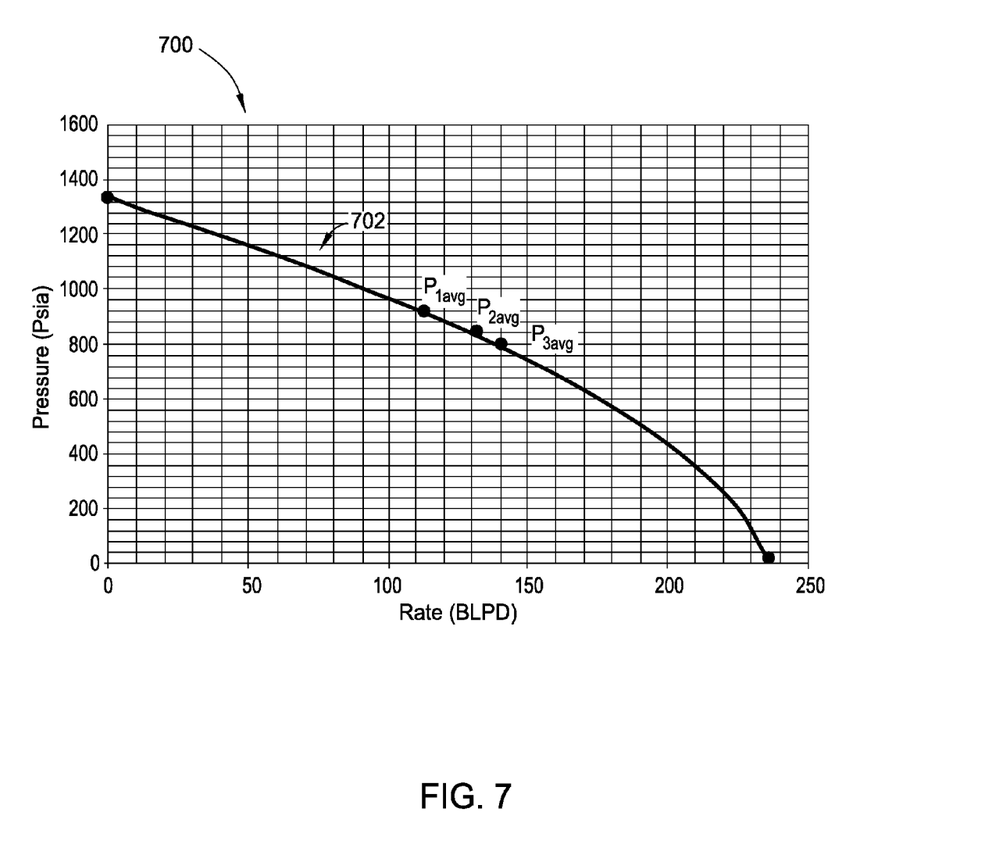
FIG. 7 is a plot illustrating an example actual IPR curve for the example reciprocating rod lift system calculated using the Vogel relationship, according to certain aspects of the present disclosure.

According to certain aspects, if $P_{ws}$, $P_{avg}$, and any one particular flow rate Q are known, the actual IPR curve 702 for the well can be calculated using the Vogel equation as shown in the plot 700 of FIG. 7.

Example Rate Calculation Based on IPR Curve

Figure 8:
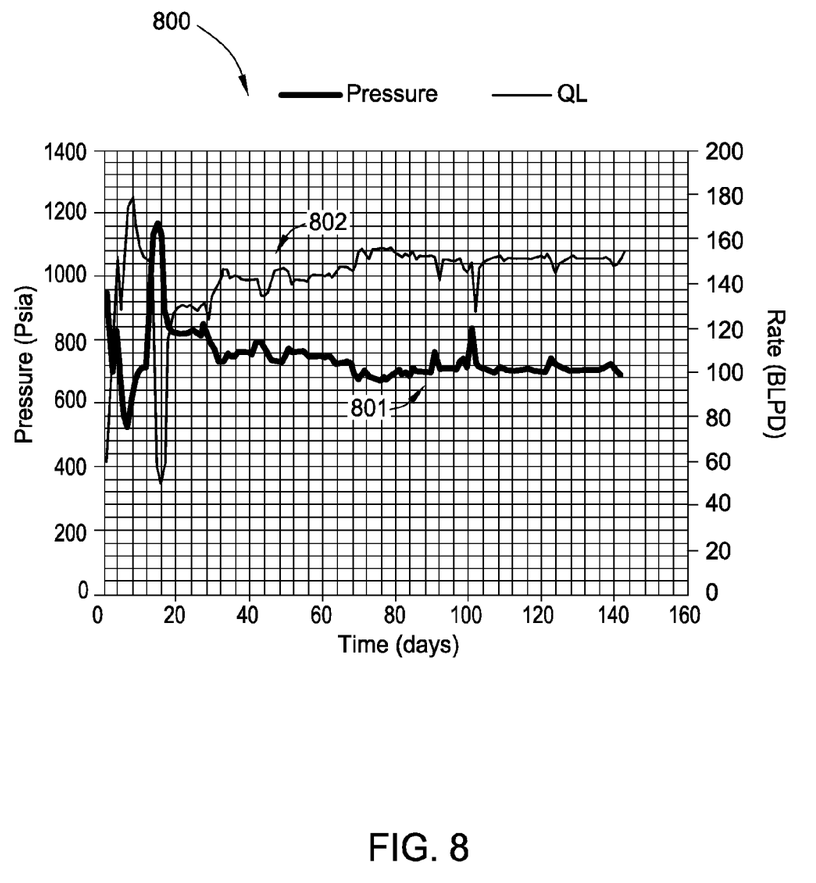
FIG. 8 is a plot illustrating example calculated flow rates of liquid corresponding to the pressure measured at any time in the example reciprocating rod lift system, according to certain aspects of the present disclosure.

According to certain aspects, knowing the IPR and downhole pressure, the fluid rates for any particular time may be calculated, and the production of the well may be determined. FIG. 8 is a plot 800 illustrating example calculated flow rates of liquid corresponding to the pressure measured at any time, according to certain aspects of the present disclosure. The bottom curve 801 may represent pressure versus time, and the top curve 802 may represent calculated flow rates of liquid versus time.

Example System Enhancement

According to certain aspects, the IPR curve may be used to enhance production of the artificial lift system. For example, a desirable target percentage or target percentage range may be defined (e.g., by the well operator) and, using the IPR curve, parameters of the artificial lift system can be adjusted or controlled in order to maintain or achieve the target flow rates.

Referring to the IPR curve illustrated in FIG. 6, the well is producing at just 59.47% of the total absolute open flow (AOF) for the third period. Best practices for rod pump artificial lift systems establish that the pressure should be close to zero for optimal production. Operationally, an average pressure ($P_{avg}$) at the pump level of less than 10% of the static pressure ($P_{ws}$) may be considered optimal. For the example well illustrated herein, this is equal to 133.6 psi, equivalent to a level of 321.64 feet, or 309 feet in the case of 100% oil. For a column of oil-water mixture having 20% water cut, it is more likely a value close to 321 feet.

Figure 9:
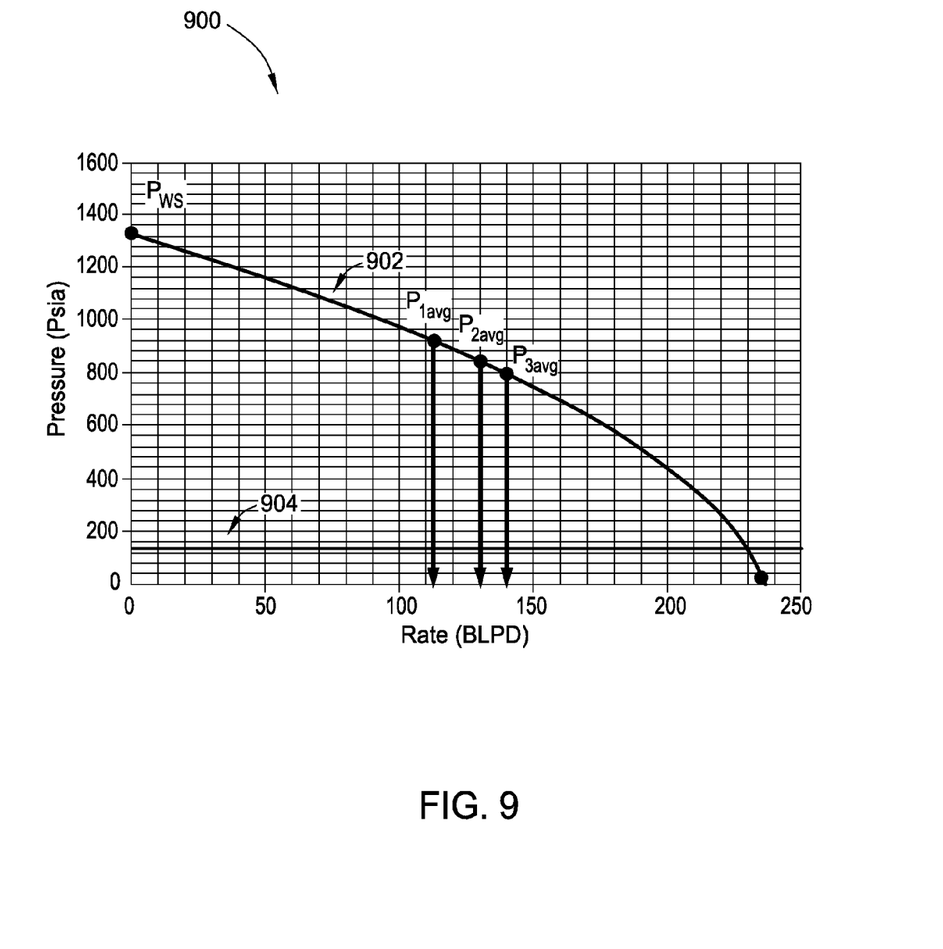
FIG. 9 is a plot illustrating example enhanced well production for the example reciprocating rod lift system, according to certain aspects of the present disclosure.

FIG. 9 is a plot 900 illustrating example well production enhancement, according to certain aspects of the present disclosure. Line 904 illustrates an example optimal pressure level at 10% of the $P_{ws}$ of the example well being illustrated. Line 902 illustrates example downhole pressure with pressure values $P_{avg}$ at particular times corresponding to particular rate Q at those times. In the example illustrated in FIG. 9, $P_{ws}$ may be equal to 1336.00 psi with a corresponding flow rate Q that is 0% of AOF; $P_{1avg}$ may be equal to 919.11 psi with a corresponding flow rate $Q_1$ that is 48.00% of AOF; $P_{2avg}$ may be equal to 844.11 psi with a corresponding flow rate $Q_2$ that is 55.65% of AOF; $P_{3avg}$ may be equal to 804.11 psi with a corresponding flow rate $Q_2$ that is 59.47% of AOF; $P_{optimal}$ may be equal to 133.60 psi with a corresponding flow rate $Q_{optimal}$ that is 97.50% of AOF; and $P_{atm}$ may be equal to 14.7 psi with a corresponding flow rate $Q_{atm}$ that is 100.00% of AOF or $Q_{max}$ as discussed above.

According to certain aspects, it is possible to increase production by close to forty percent (40%), for example, in the well if the pump is able to handle this additional volume. For example, various parameters of the artificial lift system may be adjusted according to the monitored IPR for the system in attempt to optimize the system to a desired production amount. For example, for a rod pumping system, the stroke speed or stroke length may be changed, or components of the pump itself may be changed. In the case of a gas lift artificial system, the injection rate at the surface may be changed. In the case of electrical submersible pumping (ESP) the speed of the downhole pump may be changed by adjusting the electrical current.

Figure 10:
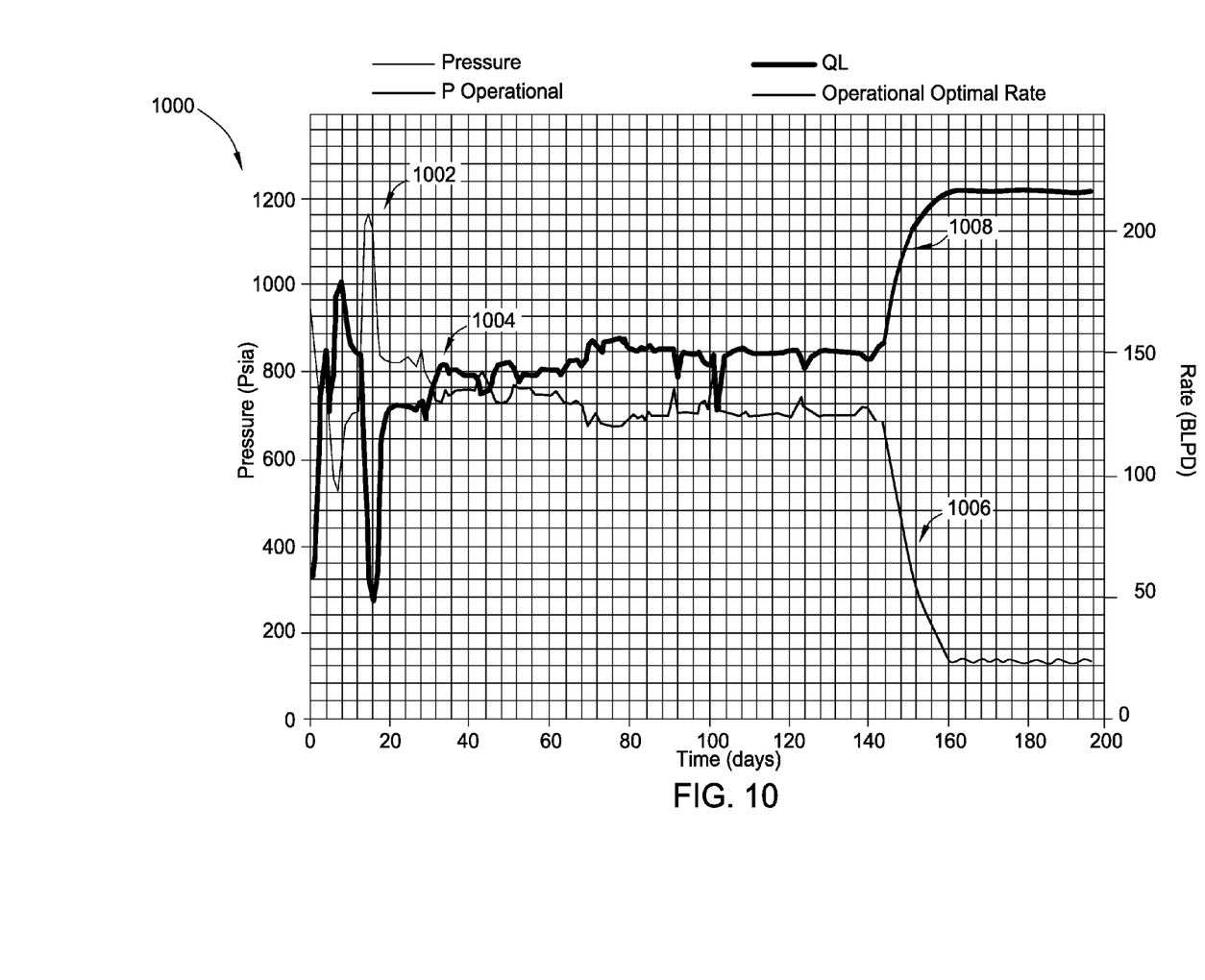
FIG. 10 is a plot illustrating example well production enhancement by reducing pressure to ten percent (10%) of the static pressure to increase production, according to certain aspects of the present disclosure.

FIG. 10 is a plot 1000 illustrating example well enhancement by reducing pressure to ten percent (10%) of the static pressure to increase production, according to certain aspects of the present disclosure. Curve 1002 may represent downhole pressure, and curve 1004 may represent the corresponding flow rates, for example, calculated based on the IPR curve over time. For example, in this case, these values may be based on the IPR calculated with reference to FIG. 7. Curve 1006 may represent operational pressure. For example, the operational pressure may be the resulting pressure as operating parameters of the artificial lift system are adjusted in an effort to optimize, or at least enhance, the system. Curve 1008 may represent the corresponding operational enhanced (e.g., optimal) flow rates achieved by adjusting the parameters to control the operational pressure. As shown in FIG. 10, by monitoring the downhole pressure, IPR, and flow rates over time, pump parameters may be adjusted to increase the rate until the enhanced pressure and flow rates are achieved.

Figure 11:
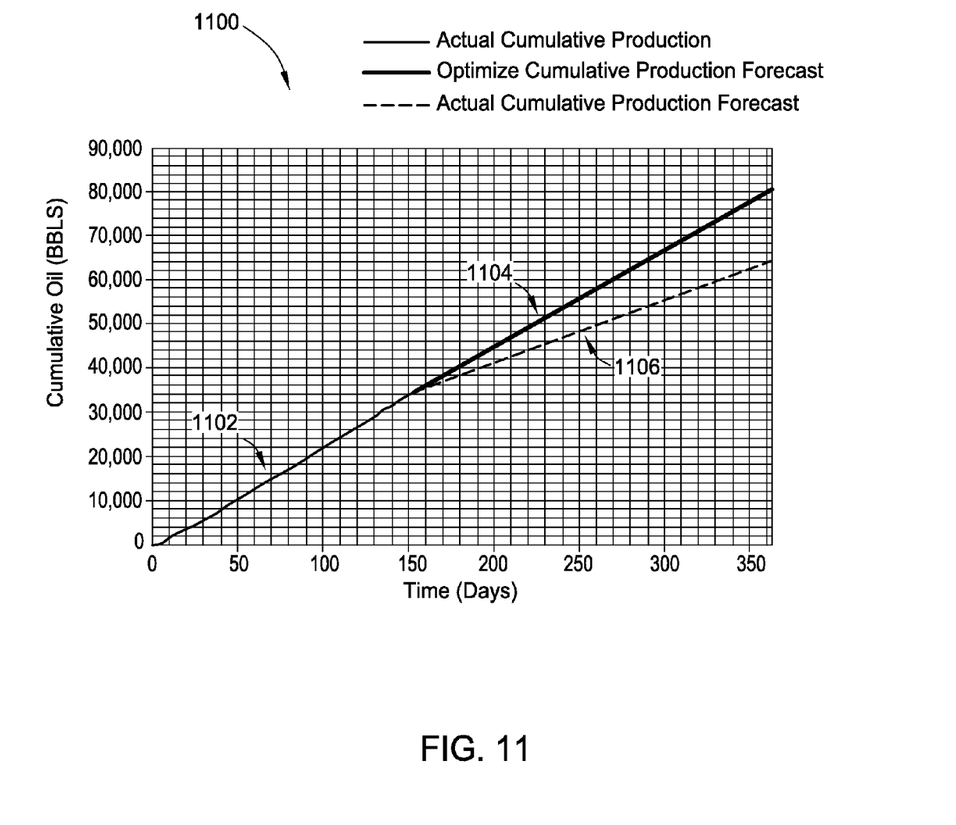
FIG. 11 is a plot illustrating the cumulative production of the example well of FIG. 10 if conditions are maintained and the cumulative production of the well is enhanced, using the real-time pressure data and calculated IPR, according to certain aspects of the present disclosure.

FIG. 11 is a plot 1100 illustrating the cumulative production of the example well if conditions are maintained and the cumulative production of the well is enhanced, using the real-time pressure data and calculated IPR, according to certain aspects of the present disclosure. The curve 1102 may show the actual cumulative production, the curve 1104 may show the enhanced (e.g., optimal) cumulative production forecast based on the adjustments, and the curve 1106 may show the actual cumulative production forecast without making adjustments. For this example, using a price of oil of $100 US per barrel (BBL) and a well production of the same 20% water cut, it can be calculated that an additional amount of close to 13,000 BBL of oil can be produced, which means close to an extra $1.3 MM US can be obtained in a period of 7 months (using these values which are merely exemplary for the sake of illustration). The investment cost associated with implementing the monitoring, analyzing, and production enhancement techniques described herein may be small compared to the additional revenues that this technology generates. Additional benefits may include corresponding savings in energy costs, maintenance, etc. Thus, the use of downhole pressure measurements may be used to enhance well productivity.

According to certain aspects, the system may be monitored and re-calibrated over time. For example, the static pressure may be re-determined (e.g., periodically), and the IPR curve for the well may be recalculated using the re-determined static pressure. This process of monitoring the static and real-time downhole pressures and adjusting the system may be referred to as "virtual flow-metering" using real-time downhole pressure.

Although described herein with respect to conventional reservoirs, according to certain aspects, these techniques are not limited to conventional reservoirs, but may be applied in other types of reservoirs, such as shale reservoirs.

According to certain aspects, the use of downhole pressure measurement gauges may allow for the inflow of the well to be accurately calculated. Thus, the productivity of the well can be determined accurately, and the behavior of the inflow over time can be monitored. This may allow the rod pump system to be operated in a predictive mode, rather than a reactive mode. Additionally, the system inflow (reservoir) and outflow (rod pump) may be operated at optimized (or at least enhanced) levels in a sustainable manner. Applying these techniques for production enhancement may reduce the lifting cost in artificial lift systems, protect the pump system, and eliminate certain types of testing, such as tests to define the liquid level.

As used herein, the term "determining" encompasses a wide variety of actions. For example, "determining" may include calculating, computing, processing, deriving, and the like. As used herein, a phrase referring to "at least one of" a list of items refers to any combination of those items, including single members.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the methods and apparatus described above without departing from the scope of the claims.

Any of the operations described above, such as the operations 300, may be included as instructions in a computer-readable medium for execution by the control unit 110 (e.g., a controller such as a rod pump controller), or any other processing system. The computer-readable medium may comprise any suitable memory for storing instructions, such as localized or remote (e.g., a cloud-based) read-only memory (ROM), random access memory (RAM), flash memory, an electrically erasable programmable ROM (EEPROM), a compact disc ROM (CD-ROM), or a floppy disk.

While the foregoing is directed to aspects of the present disclosure, other and further aspects of the disclosure may be devised without departing from the basic scope thereof, and the scope thereof is determined by the claims that follow.

The invention claimed is:

1. A method for controlling a rod pump used to produce fluids from a wellbore, comprising:
    monitoring one or more downhole parameters including a first pressure in the wellbore;
    calculating an average of the first pressure over a period of time;
    determining a second pressure in the wellbore corresponding to the period of time;
    determining a point on an Inflow Performance Relationship (IPR) curve based on the second pressure and the average of the first pressure;
    determining a first flow rate based on the determined point on the IPR curve;
    selecting a third pressure based on the IPR curve, wherein the third pressure corresponds to a second flow rate that is closer to an absolute open flow rate of the wellbore than the first flow rate; and
    adjusting one or more pump parameters used to control the rod pump to operate the rod pump at the third pressure.

2. The method of claim 1, wherein the one or more downhole parameters are monitored via one or more permanently installed sensors.

3. The method of claim 1, further comprising:
    determining a fourth pressure in the wellbore;
    determining a point on another IPR curve based on the fourth pressure and the first pressure;
    determining a third flow rate based on the point on the other IPR curve;
    determining a fifth pressure based on the other IPR curve, wherein the fifth pressure corresponds to a fourth flow rate that is closer to the absolute open flow rate of the wellbore than the third flow rate; and
    readjusting the one or more pump parameters used to control the rod pump to operate the rod pump at the fifth pressure.

4. The method of claim 3, wherein the fourth pressure in the wellbore is a static pressure.

5. The method of claim 1, wherein the one or more pump parameters comprise at least one of stroke speed, stroke length, minimum rod load, or maximum rod load.

6. The method of claim 1, wherein the second pressure in the wellbore is a static pressure.

7. The method of claim 1, wherein the third pressure is selected based on a percentage of the second pressure.

8. A system for producing fluids from a wellbore, comprising:
    a rod pump disposed in the wellbore;
    one or more sensors deployed in the wellbore and configured to monitor one or more downhole parameters including a first pressure in the wellbore; and
    a controller configured to:
        calculate an average of the first pressure over a period of time;
        determine a second pressure in the wellbore corresponding to the period of time;
        determine a point on an Inflow Performance Relationship (IPR) curve based on the second pressure and the average of the first pressure;
        determine a first flow rate based on the determined point on the IPR curve;
        select a third pressure based on the IPR curve, wherein the third pressure corresponds to a second flow rate that is closer to an absolute open flow rate of the wellbore than the first flow rate; and
        adjust one or more pump parameters used to control the rod pump to operate the rod pump at the third pressure.

9. The system of claim 8, wherein the one or more sensors comprise one or more permanently installed sensors.

10. The system of claim 8, wherein the one or more sensors comprise one or more pressure gauges.

11. The system of claim 10, wherein the controller is further configured to:
    determine a fourth pressure in the wellbore;

determine a point on another IPR curve based on the fourth pressure and the first pressure;
determine a third flow rate based on the point on the other IPR curve;
determine a fifth pressure based on the other IPR curve, wherein the fifth pressure corresponds to a fourth flow rate that is closer to the absolute open flow rate of the wellbore than the third flow rate; and
readjust the one or more pump parameters used to control the rod pump to operate the rod pump at the fifth pressure.

12. The system of claim 8, wherein the one or more pump parameters comprise at least one of stroke speed, stroke length, minimum rod load, or maximum rod load.

13. The system of claim 8, wherein the second pressure in the wellbore is a static pressure.

14. The system of claim 8, wherein the third pressure is selected based on a percentage of the second pressure.

15. A non-transitory computer-readable medium having instructions stored thereon for controlling a rod pump used to produce fluids from a wellbore, the instructions comprising:
instructions for monitoring one or more downhole parameters including a first pressure in the wellbore;
instructions for calculating an average of the first pressure over a period of time;
instructions for determining a second pressure in the wellbore corresponding to the period of time;
instructions for determining a point on an Inflow Performance Relationship (IPR) curve based on the second pressure and the average of the first pressure;
instructions for determining a first flow rate based on the determined point on the IPR curve;
instructions for selecting a third pressure based on the IPR curve, wherein the third pressure corresponds to a second flow rate that is closer to an absolute open flow rate of the wellbore than the first flow rate; and
instructions for adjusting one or more pump parameters used to control the rod pump to operate the rod pump at the third pressure.

16. The computer-readable medium of claim 15, wherein the one or more downhole parameters are monitored via one or more permanently installed sensors.

17. The computer-readable medium of claim 15, wherein the second pressure in the wellbore is a static pressure.

18. The computer-readable medium of claim 17, the instructions further comprising:
instructions for determining a fourth pressure in the wellbore;
instructions for determining a point on another IPR curve based on the fourth pressure and the first pressure;
instructions for determining a third flow rate based on the point on the other IPR curve;
instructions for determining a fifth pressure based on the other IPR curve, wherein the fifth pressure corresponds to a fourth flow rate that is closer to the absolute open flow rate of the wellbore than the third flow rate; and
instructions for readjusting the one or more pump parameters used to control the rod pump to operate the rod pump at the fifth pressure.

19. The computer-readable medium of claim 15, wherein the one or more pump parameters comprise at least one of stroke speed, stroke length, minimum rod load, or maximum rod load.

20. A method for controlling a rod pump used to produce fluids from a wellbore, comprising:
monitoring one or more downhole parameters including a first pressure in the wellbore;
calculating an average of the first pressure over a period of time;
determining a second pressure in the wellbore corresponding to the period of time;
determining a point on an Inflow Performance Relationship (IPR) curve based on the second pressure and the average of the first pressure;
determining a first flow rate based on the determined point on the IPR curve;
selecting a second flow rate greater than the first flow rate based on an ability of the rod pump to handle an additional volume associated with the second flow rate;
calculating a third pressure based on the second flow rate and the IPR curve; and
adjusting one or more pump parameters used to control the rod pump to operate the rod pump at the third pressure.

21. The method of claim 20, wherein the one or more downhole parameters are monitored via one or more permanently installed sensors.

22. The method of claim 20, further comprising:
determining a fourth pressure in the wellbore;
determining a point on another IPR curve based on the fourth pressure and the first pressure;
determining a third flow rate based on the point on the other IPR curve;
selecting a fourth flow rate greater than the third flow rate based on an ability of the rod pump to handle an additional volume associated with the fourth flow rate;
calculating a fifth pressure based on the fourth flow rate and the other IPR curve; and
readjusting the one or more pump parameters used to control the rod pump to operate the rod pump at the fifth pressure.

23. The method of claim 20, wherein the one or more pump parameters comprise at least one of stroke speed, stroke length, minimum rod load, or maximum rod load.

24. The method of claim 20, wherein the second pressure in the wellbore is a static pressure.

* * * * *